(12) United States Patent
Roussel-Galle et al.

(10) Patent No.: US 11,108,904 B2
(45) Date of Patent: Aug. 31, 2021

(54) METHOD FOR USING AUTOMATIC COMMUNICATION MANAGEMENT, METHOD AND DEVICE FOR AUTOMATIC COMMUNICATION MANAGEMENT, AND TERMINAL USING SAME

(71) Applicant: Orange, Paris (FR)

(72) Inventors: Olivier Roussel-Galle, Saint Agathon (FR); Pierre-Henri Simon, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/552,783

(22) PCT Filed: Feb. 22, 2016

(86) PCT No.: PCT/FR2016/050402
§ 371 (c)(1),
(2) Date: Aug. 22, 2017

(87) PCT Pub. No.: WO2016/135403
PCT Pub. Date: Sep. 1, 2016

(65) Prior Publication Data
US 2018/0097924 A1    Apr. 5, 2018

(30) Foreign Application Priority Data
Feb. 23, 2015 (FR) ..................... 1551527

(51) Int. Cl.
*H04M 1/67* (2006.01)
*H04M 3/14* (2006.01)
(Continued)

(52) U.S. Cl.
CPC ............... *H04M 1/67* (2013.01); *G10L 25/78* (2013.01); *H04M 1/663* (2013.01); *H04M 3/14* (2013.01);
(Continued)

(58) Field of Classification Search
CPC ............... H04M 1/72569; H04M 7/00; H04M 1/72577; H04M 1/72083; H04M 3/436;
(Continued)

(56) References Cited

U.S. PATENT DOCUMENTS 5,930,352 A * 7/1999 Hiraiwa ............... H04M 1/2746
379/390.01
6,662,026 B1 * 12/2003 Cordray ............ H04M 1/72519
455/343.4
(Continued)

FOREIGN PATENT DOCUMENTS

| EP | 2 824 897 A1 | 1/2015 | |
| WO | WO 2011/053428 A1 * | 5/2011 | ............... H04M 7/00 |
| WO | WO-2011053428 A1 * | 5/2011 | ............... G10L 25/78 |

OTHER PUBLICATIONS

International Search Report and Written Opinion dated Jun. 13, 2016 for Application No. PCT/FR2016/050402.

*Primary Examiner* — Binh Kien Tieu
(74) *Attorney, Agent, or Firm* — Knobbe, Martens, Olson & Bear, LLP

(57) ABSTRACT

Embodiments discussed herein relate to automatic communication management, such as automated closure of a communication in circumstances where establishment of the communication is accidental, particularly from mobile terminals. A method of use of automatic communication management is disclosed. The method can include a triggering, following establishment of a communication between at least a communication terminal of the user and at least one other communication terminal, an activated automatic communication management which enables triggering of a closure of the established communication in progress as a function of the detected vocal sound level on at least one audio stream of the established communication in progress. In this way, if establishment of the communication is
(Continued)

Figure 1:
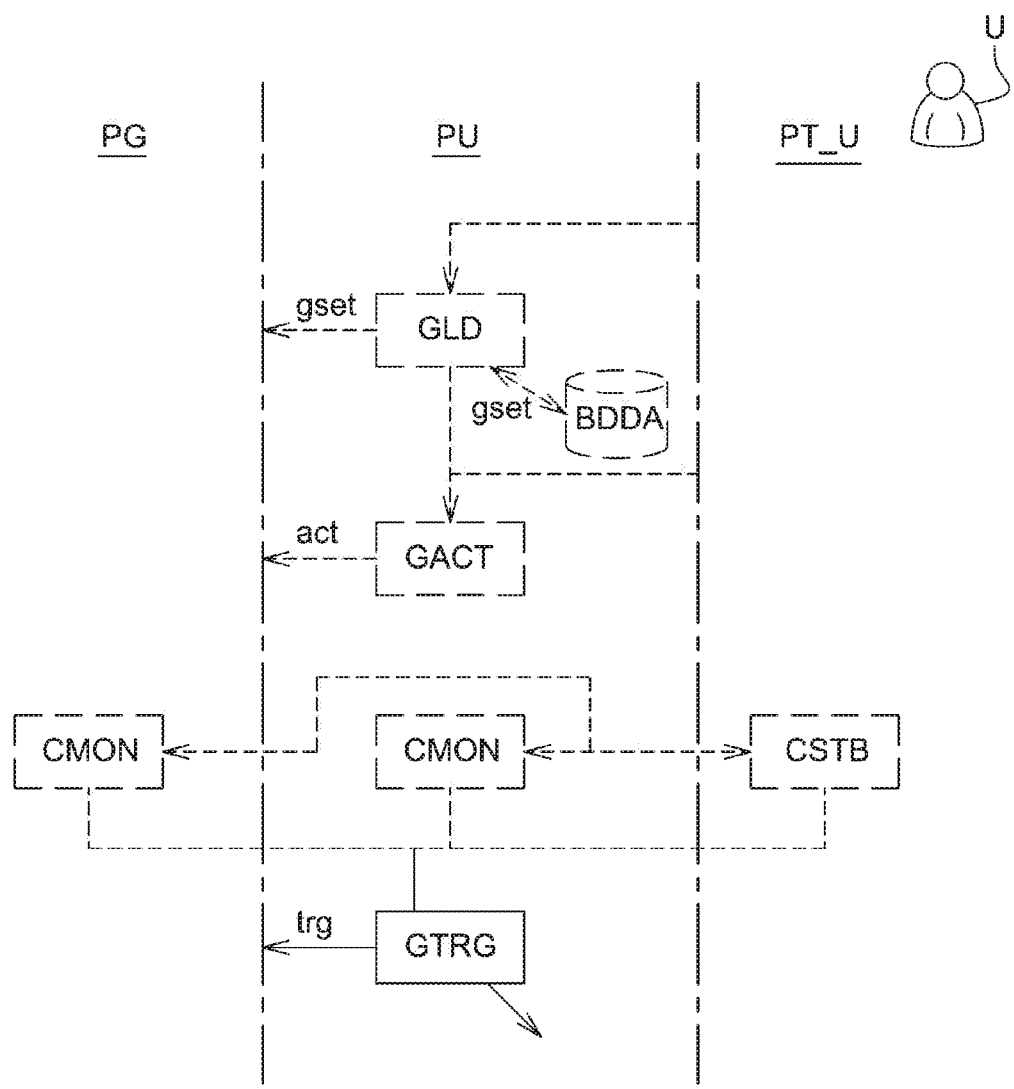

detected as being unintentional because of the vocal sound level of the communication, the communication will be closed.

15 Claims, 5 Drawing Sheets

(51) Int. Cl.
    *H04M 1/663*     (2006.01)
    *G10L 25/78*     (2013.01)
    *H04W 52/02*     (2009.01)
    *H04W 76/38*     (2018.01)

(52) U.S. Cl.
    CPC ... *H04W 52/0251* (2013.01); *G10L 2025/783* (2013.01); *H04M 2203/2027* (2013.01); *H04M 2203/5027* (2013.01); *H04W 76/38* (2018.02); *Y02D 30/70* (2020.08)

(58) Field of Classification Search
    CPC ......... H04W 88/02; H04W 4/16; G10L 11/02; G06F 3/041; G06F 3/0482
    USPC ............ 455/406, 407, 343.4, 567, 418, 564; 379/201.01, 201.1, 204.1, 207.02
    See application file for complete search history.

(56) References Cited

U.S. PATENT DOCUMENTS

| | | | |
|---|---|---|---|
| 7,283,624 B1 | 10/2007 | Meek et al. | |
| 9,031,532 B2* | 5/2015 | Dam Nielsen | H04M 1/67 455/410 |
| 2003/0143986 A1 | 7/2003 | Mufti et al. | |
| 2006/0023061 A1* | 2/2006 | Vaszary | H04M 3/56 348/14.08 |
| 2006/0166677 A1* | 7/2006 | Derakshan | H04W 36/14 455/453 |
| 2009/0316932 A1* | 12/2009 | Campion | H04M 1/6016 381/107 |
| 2010/0166161 A1* | 7/2010 | Dhawan | H04M 1/2478 379/88.19 |
| 2011/0287754 A1* | 11/2011 | Schlueter | H04M 1/67 455/418 |
| 2012/0182381 A1* | 7/2012 | Abate | H04L 12/1822 348/14.03 |
| 2013/0084834 A1* | 4/2013 | Tivyan | H04M 1/67 455/414.1 |
| 2014/0094154 A1* | 4/2014 | Harris | H04M 1/67 455/414.1 |
| 2014/0099004 A1* | 4/2014 | DiBona | H04N 7/15 382/118 |
| 2014/0120891 A1* | 5/2014 | Chen | H04W 4/001 455/418 |
| 2014/0222436 A1* | 8/2014 | Binder | G10L 17/24 704/275 |
| 2015/0080048 A1* | 3/2015 | Fang | H04M 1/72519 455/550.1 |
| 2015/0080084 A1* | 3/2015 | Saunders | G07F 17/34 463/20 |
| 2015/0156598 A1* | 6/2015 | Sun | H04N 7/147 348/14.07 |
| 2015/0215454 A1* | 7/2015 | Matsuo | H04W 4/90 455/414.1 |
| 2016/0227022 A1* | 8/2016 | Alameh | G06F 1/1643 |
| 2016/0227023 A1* | 8/2016 | Maly | H04M 1/271 |

* cited by examiner

METHOD FOR USING AUTOMATIC COMMUNICATION MANAGEMENT, METHOD AND DEVICE FOR AUTOMATIC COMMUNICATION MANAGEMENT, AND TERMINAL USING SAME

RELATED APPLICATIONS

This application is the U.S. National Phase of Application No. PCT/FR2016/050402 entitled "METHOD FOR USING AUTOMATIC COMMUNICATION MANAGEMENT, METHOD AND DEVICE FOR AUTOMATIC COMMUNICATION MANAGEMENT, AND TERMINAL USING SAME" filed Feb. 22, 2016, which designated the United States, and which claims the benefit of French Application No. 1551527 filed Feb. 23, 2015.

The invention relates to automatic management of communication. In particular, it relates to automated communication closure under circumstances of inadvertent communication establishment, especially from mobile terminals.

With landlines, it was known to manage the inadvertent taking of the handset off-hook. Indeed, joggling the handset on its base can cause the telephone to go off-hook, which then prevents anybody wishing to do so from communicating with the user of the off-hook telephone.

To solve this problem, it was in particular proposed that in the absence of activity while off-hook, the telephone be disconnected from the network as taught by document U.S. Pat. No. 4,922,529, allowing the telephone whose handset has been unintentionally taken off-hook to be called again.

Mobile telephony and, in particular, transporting the mobile telephone in a pocket or with other items in a bag, may accidentally cause not only the telephone to go off-hook but even a communication to be established by pressing a redial key or a prerecorded contact. For example, the typical case of fortuitous calling by rubbing or pressure in a carrying-case or a pocket is the calling of the last party called or of the one open in the directory of contacts.

To avoid these inadvertent establishments of communication, a locking of mobile communication terminals is proposed: locking of the keypad and/or of the screen of the mobile communication terminal. This technical solution avoids inadvertent establishment of communication on condition that the terminal is locked, and that the locking cannot be accidentally deactivated.

Experience shows, indeed, that, despite everything, calls are sometimes made unintentionally with mobile telephones. In addition to the disruption caused to the called party: call with no opposite party at the end of the line; inaudible telephone messages; impossible for the called party to ask to establish a communication with the caller in order to verify that everything is OK . . . , the caller discovers, a posteriori, numerous very long communications that he cannot explain, sometimes interrupted by the end of the called party's messaging.

One of the aims of the present invention is to afford improvements with respect to the prior art.

A subject of the invention is a use of automatic management of communication. The use implemented by a communication terminal of a user comprising a triggering, further to an establishment of a communication between at least the communication terminal of the user and at least one other communication terminal: a communication terminal requesting the establishment of a communication and at least one communication terminal which is a recipient of the requested communication, of an activated automatic management of communication which allows a triggering of a closure of the established communication in progress as a function of the voice sound level detected on at least one audio stream of the established communication in progress.

Thus, if the establishment of the communication is detected as unintentional by reason of the voice sound level of the communication, the communication will be closed.

Advantageously, the use comprises an activation by the user by means of a user interface of the communication terminal of the user of an automatic management of communication.

Thus, the user can choose to activate or otherwise the automatic management of the communications making it possible to automatically manage the communications inadvertently sent and/or received on certain occasions and to avoid closure of inadvertent communications on other occasions.

A subject of the invention is further a method of automatic management of communication in progress between at least two communication terminals: a communication terminal requesting the establishment of a communication and at least one communication terminal which is a recipient of the requested communication, the management method comprising a triggering of a closure of the communication in progress as a function of a voice sound level detected for a predetermined duration during the communication in progress.

Thus the invention allows the management of unintentional communication based on detecting the sound voice level, in particular on at least one audio stream of the established communication.

Advantageously, the management method comprises a detection of the voice sound level of the communication in progress.

Thus, the detection of the voice sound level is an alternative to another type of detection of unintentional communication making it possible to verify the unintentional character of the communication, based on the opportunity for this communication to allow the subject of a communication namely a vocal exchange.

Advantageously, the management method comprises a determination of the maintaining of a communication in progress as a function of at least one predetermined parameter of the communication in progress, the determination of maintaining controls the prevention of any automatic closure of communication of the communication in progress.

Thus, for pre-identified communications, the low voice sound level of the communication in progress will not trigger, exceptionally, the closure of the communication by the automatic management of communication.

Advantageously, the at least one predetermined parameter comprises at least one of the following predetermined parameters:

An identifier of a communication terminal which is a recipient of the communication in progress is a predetermined identifier;

A parameter of mode of use of the communication terminal requesting the communication in progress is in mute mode.

Thus, the pre-identified communications for which the low voice sound level of the communication in progress will not trigger, exceptionally, the closure of the communication by the automatic management of communication, are in particular:

communications with a pre-identified recipient such as an emergency center (fire brigade, paramedics, telemonitoring center, medical personnel, prerecorded emergency call number . . . ) thus allowing the caller in a distress situation to be able to remain in communication with a person accompanying them during this communication for as long as it takes for the emergency services to arrive in situ;

telephone conferences, which certain participants attend in mute mode.

Advantageously, the management method is triggered by an establishment of a communication between the at least two communication terminals.

Thus, either the management method monitors the establishment of the communications and is triggered upon the establishment of a communication, or the method of communication establishment comprises a triggering of the management method after having received the recipient terminals' acceptance that the communication be enabled.

Advantageously, the management method is implemented by at least one of the following devices:
the requesting communication terminal,
at least one of the at least one recipient communication terminals,
a communication server through which the audio streams pass during the communication in progress.

Thus, the caller's terminal will itself terminate the communications that it itself will have requested unintentionally and/or the called party's terminal will itself terminate the inadvertent communications that it will receive or the users' terminals will be unburdened of the processing required for communication management by the communication server.

Advantageously, the detection of the voice sound level is performed on the audio stream originating from the requesting communication terminal. Thus, the automatic management of communication closes the communications that were requested unintentionally.

Advantageously, the detection of the voice sound level is performed on the audio stream originating from at least one of the at least one recipient communication terminals. Thus, the automatic management of communication closes the communications that were accepted unintentionally.

Advantageously, the predetermined duration is less than the duration of communication before toggling over to messaging. Thus, the automatic management of communication avoids the overloading of the messaging connected with inadvertent communications.

Advantageously, when the communication is performed between a requesting communication terminal and several recipient communication terminals, communication closure is triggered only for the recipient communication terminal from which an audio stream originates for which the detected voice sound level triggers a communication closure.

Thus, during a telephone conference, if one of the recipient terminals has unintentionally accepted entry into the telephone conference, the communication with this recipient terminal will be closed but the communication between the other participating terminals will continue except of course if the recipient terminal is in mute mode.

Advantageously, according to an implementation of the invention, the various steps of the method according to the invention are implemented by a piece of software or computer program, this piece of software comprising software instructions intended to be executed by a data processor of a device for automatic management of communication and being designed to control the execution of the various steps of this method.

The invention therefore also envisages a program comprising program code instructions for the execution of the steps of the method of automatic management of communication when said program is executed by a processor.

This program can use any programming language and be in the form of source code, object code or code intermediate between source code and object code such as in a partially compiled form or in any other desirable form.

A subject of the invention is also a device for automatic management of communication in progress between at least two communication terminals: a communication terminal requesting the establishment of a communication and at least one communication terminal which is a recipient of the requested communication, the management device comprising a closure trigger for closing the communication in progress as a function of a voice sound level detected for a predetermined duration during the communication in progress.

A subject of the invention is also a communication terminal comprising:
a module for communication with at least one communication terminal,
a device for automatic management of communication in progress between the communication terminal and at least one other communication terminal: a communication terminal requesting the establishment of a communication and at least one communication terminal which is a recipient of the requested communication, the management device comprising a closure trigger for closing the communication in progress as a function of a voice sound level detected for a predetermined duration during the communication in progress.

Figure 2:
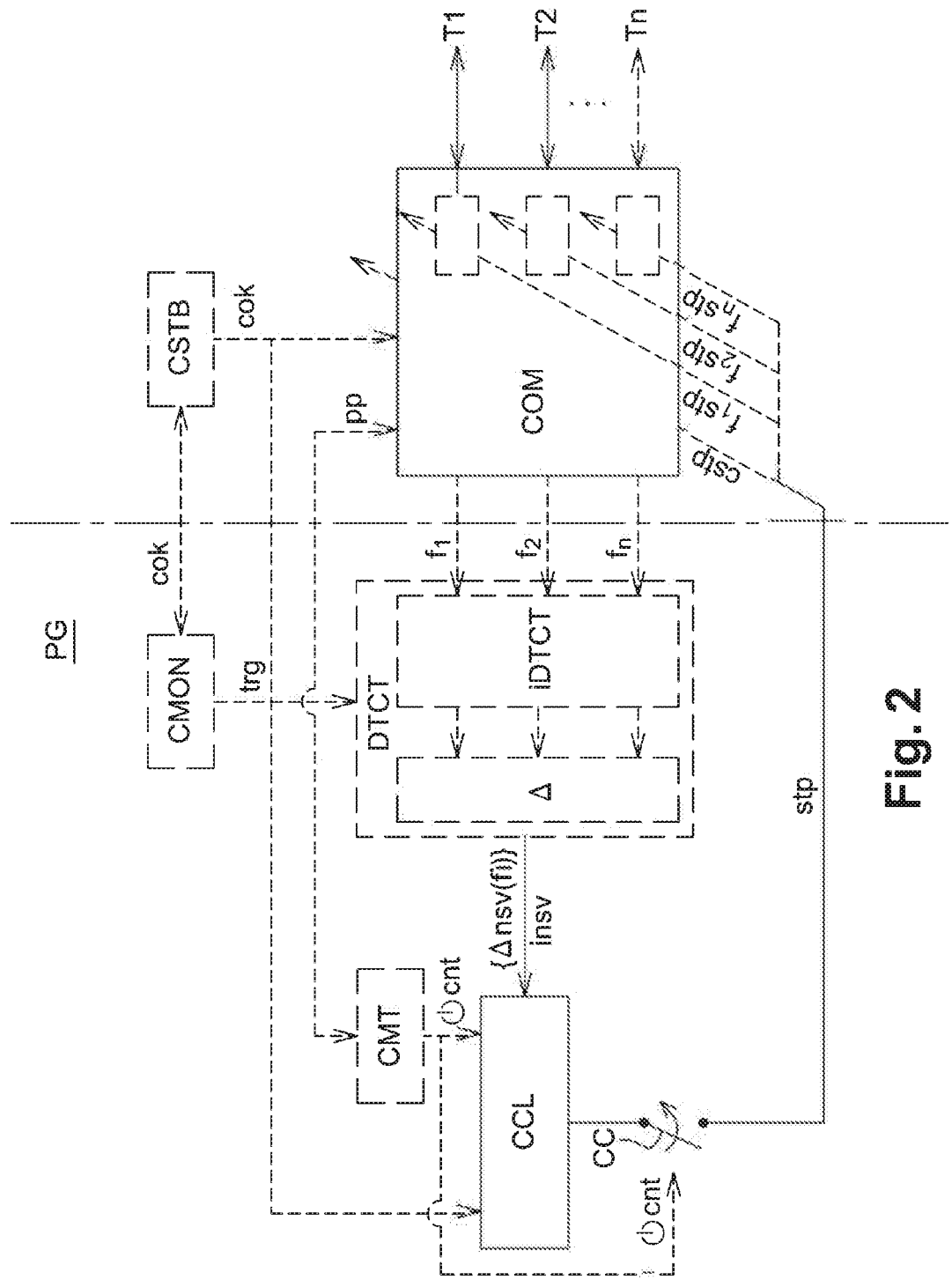
Figure 3A:
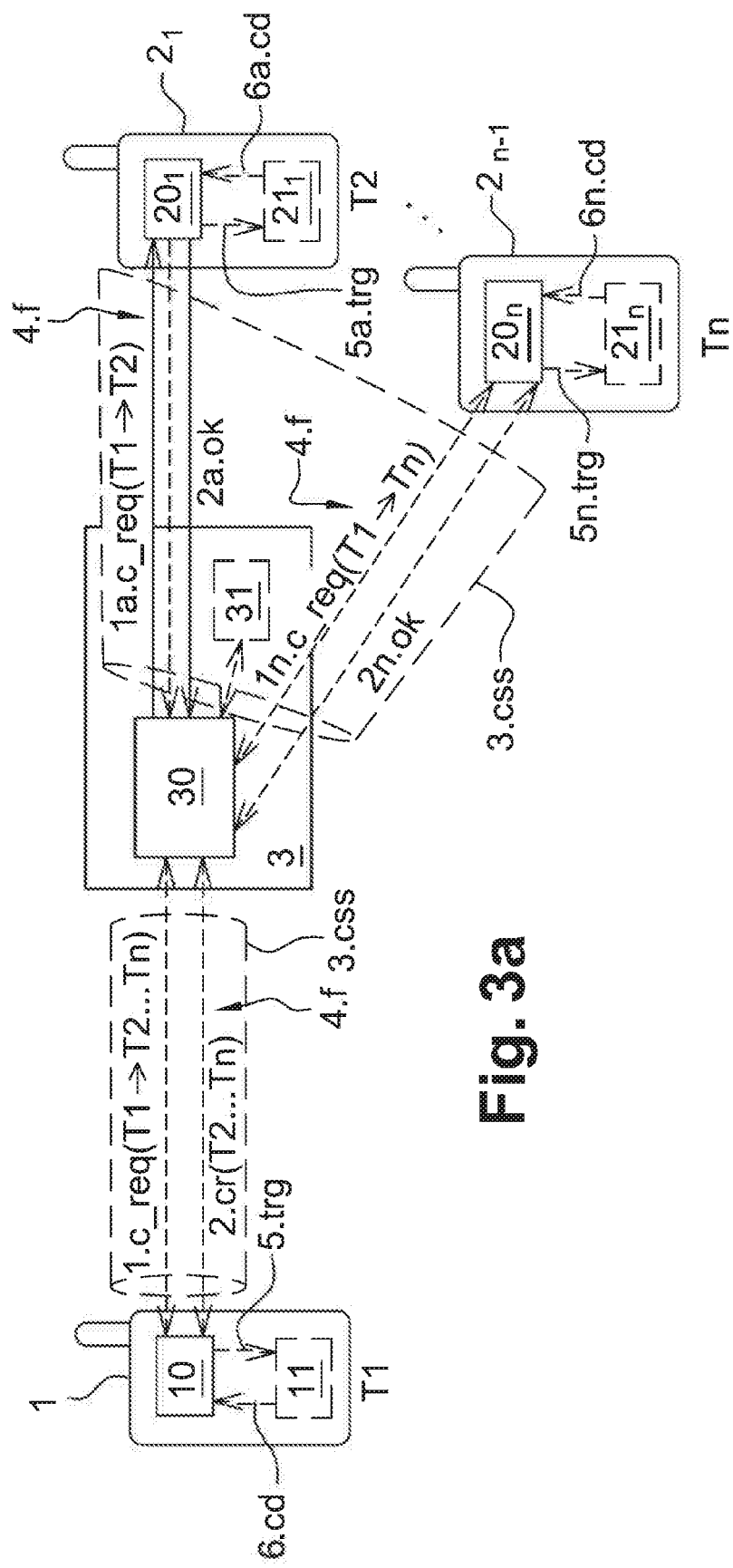
Figure 3B:
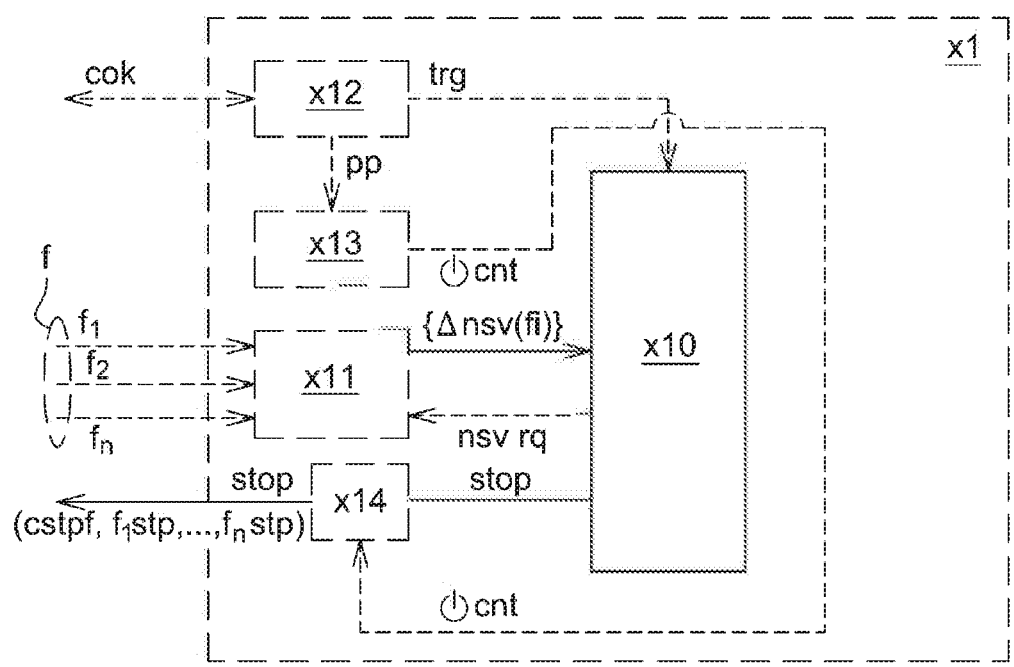
Figure 4A:
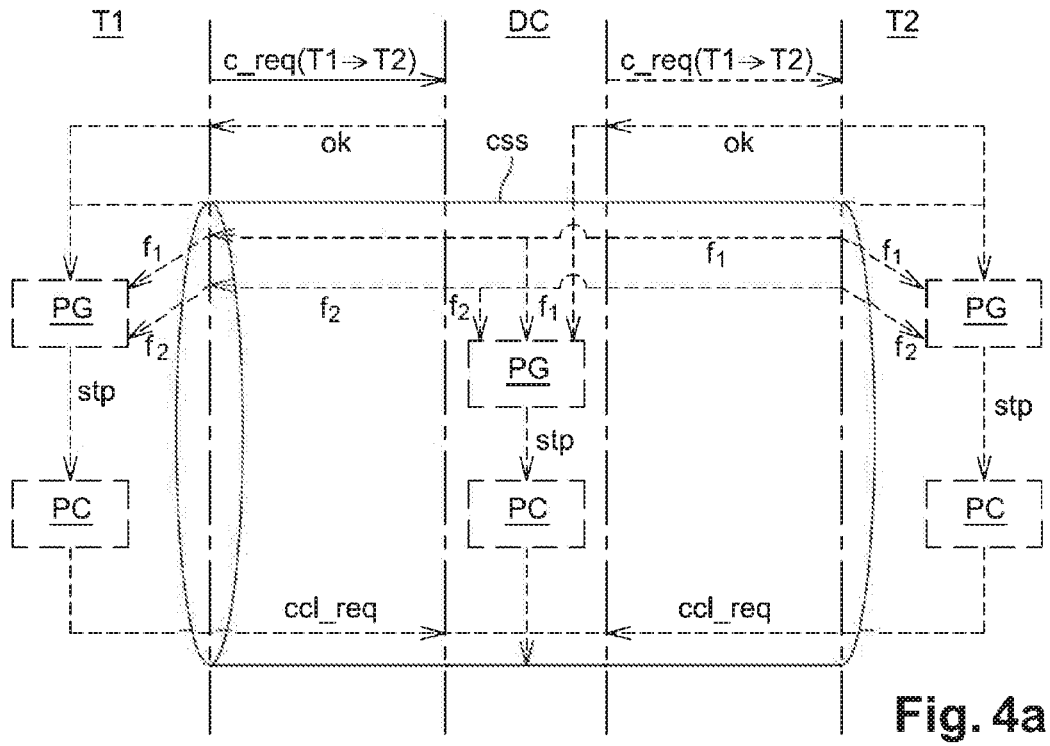
Figure 4B:
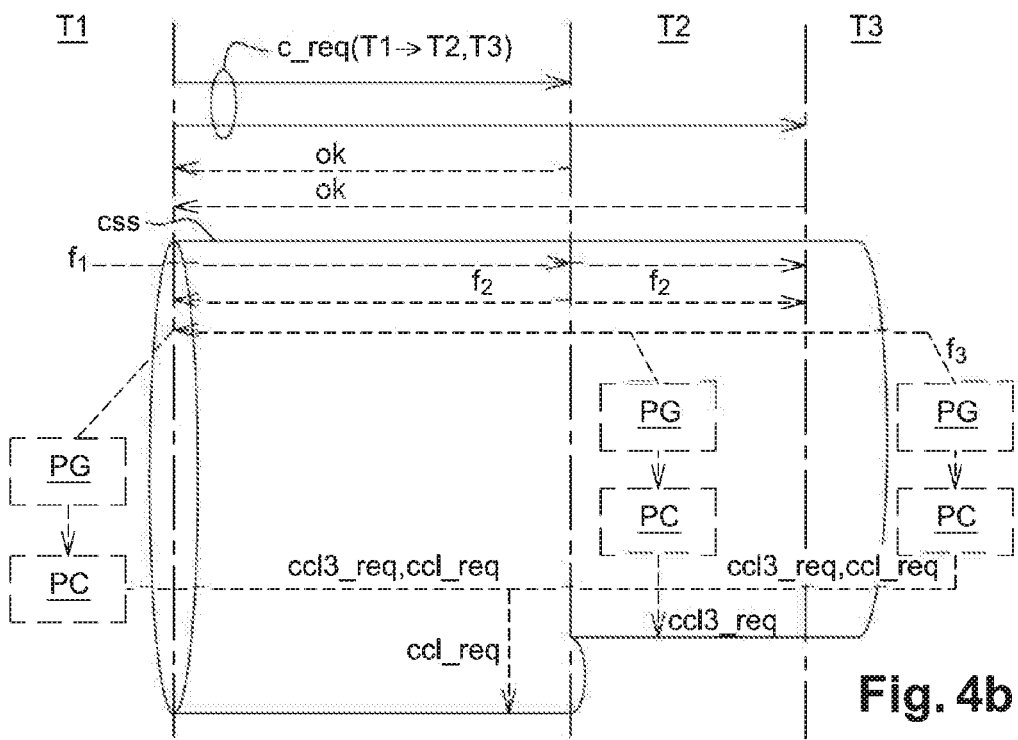

The characteristics and advantages of the invention will become more clearly apparent on reading the description, given by way of example, and the figures pertaining thereto, which represent:

FIG. 1, a simplified diagram of a method of an automatic management of communication according to the invention, FIG. 2, a simplified diagram of a method of automatic management of communication according to the invention, FIGS. 3a and 3b, simplified diagrams respectively of a communication architecture implementing the invention, and of a device for automatic management of communication according to the invention, used by this communication architecture, FIGS. 4a and 4b, charts of simplified exchanges illustrating the implementation of a method according to the invention, respectively in the case of a communication between two communication terminals, and of a conference between three communication terminals.

The invention applies to any type of voice communication from communication terminals, such as landline (STN, VOiP), mobile telephone, tablets, phablets, computers . . . .

FIG. 1 illustrates a simplified diagram of a method of an automatic management of communication according to the invention.

The method of use PU of an automatic management of communication is in particular implemented by a communication terminal of a user. The method of use PU comprises a triggering, further to an establishment of a communication between at least the communication terminal of the user and at least one other communication terminal: a communication terminal requesting the establishment of a communication and at least one communication terminal which is a recipient of the requested communication, of an activated automatic management PG of communication which allows a triggering of a closure of the established communication in progress as a function of the voice sound level detected on at least one audio stream of the established communication in progress.

In particular, a user U interacts with a communication terminal by means of a method implemented by the communication terminal PT_U. This method comprises in particular a processing of the user's interactions with the communication terminal, and a management of the communications of the terminal comprising, for example, an establishment of a communication CSTB with a second communication terminal.

The processing of the interactions of the user PT_U recognizes, for example, a request of the user for loading a method of automatic management of the communications PG. The method of use PU receives in particular a request for loading the processing of the interactions PT_U, and comprises a loading GLD of the method of automatic management PG of the communications on the communication terminal of the user U, in particular with the help of a database, such as a catalog of BDDA applications accessible by the terminal of the user U. The loading GLD then receives the management method gset and provides it gset to the, or indeed installs it on the user's terminal so that he can implement it. In another alternative, the management method PG is, for example, pre-installed on the communication terminal of the user U.

In particular, the method of use PU comprises an activation of the automatic management method GACT. This activation GACT is performed either directly as soon as the loading GLD has terminated, or on command of the user by means of the processing of the interactions of the user with the communication terminal PT_U. Thus, in particular, the activation GACT is triggered by the user by means of a user interface of the communication terminal of the user of an automatic management of communication. Thus, the user can choose to activate or otherwise the automatic management of the communications making it possible to automatically manage the communications inadvertently sent and/or received on certain occasions and to avoid closure of inadvertent communications on other occasions.

The activation GACT dispatches an activation command act to the automatic management method. Thus, the user U can activate and/or deactivate the method of automatic management of the communications as a function of their needs and in particular of their contexts of communication.

The method of automatic communication management PG being activated, either the method of use, or the method of automatic management of communication optionally comprises a monitoring CMON of the communications of the communication terminal, in particular of the establishment of the communications CSTB.

In particular, the method of use PU comprises a triggering GTRG of the atomic automatic management of communication transmitting a triggering command trg to the management method PG. The transmission by the triggering GTRG of this command trg is dependent on the establishment of a communication with the communication terminal of the user. Thus, the triggering GTRG receives data relating to an establishment of a communication with the communication terminal of the user either directly from the establishment of communication CSTB of the method implemented by the communication terminal PT_U, or from monitoring CMON implemented either by the management method PG or by the method of use PU.

In a variant of the invention, the triggering GTRG and, if appropriate, the monitoring, is implemented only if the management method PG has been activated GACT.

Thus, if the establishment of the communication is detected as unintentional by reason of the voice sound level of the communication, the communication will be closed.

FIG. 2 illustrates a simplified diagram of a method of automatic management of communication according to the invention.

The method PG of automatic management of communication in progress between at least two communication terminals: a requesting communication terminal T1, the establishment of a communication and at least one recipient communication terminal T2 . . . Tn receiving the requested communication, comprises a triggering CCL of a closure of the communication in progress as a function of a voice sound level nsv detected for a predetermined duration Δ during the communication in progress.

Thus the invention allows the management of unintentional communication based on the detection of the sound voice level.

The invention makes it possible to prevent the established inadvertent communication from lasting too long preventing other talkers from reaching the users of the terminals involved in the inadvertent communication in progress.

In particular, an establishment of a communication CSTB triggers a management of the exchanges COM of the established communication session and, in parallel, triggers cok the implementation of the management method PG, in particular the communication closure triggering step CCL.

The management of the exchanges COM allows several communication terminals, including a requesting terminal T1 and at least one recipient terminal T2 . . . Tn, to exchange during the this communication session, either audio streams, or video streams, or data streams. The user of the requesting terminal T1 discusses with the users of the recipient terminals T2 . . . Tn: an audio stream f1 is of which sent by the requesting terminal T1 destined for the other terminals participating in the communication T2 . . . Tn, and in a similar manner audio streams f2 . . . fn are sent by the recipient terminals T2 . . . Tn destined for the other terminals participating in the communication T1 . . . Tn.

The management method PG comprises, in particular, a monitoring of the establishment of communication CMON which either exchanges with the establishment of communication CSTB or senses the communication session opening signal cok provided by the establishment of communication CSTB.

The monitoring of the establishment of communication CMON triggering triggers the implementation of the management method PG, in particular, directly or indirectly of the communication closure triggering CCL. For example, the monitoring of the establishment of communication CMON triggers a voice sound level detection DTCT, implemented optionally by the management method PG, which provides either the detected voice sound level nsv or an item of information on the detected voice sound level insv to the communication closure triggering CCL.

The communication closure triggering CCL determines as a function of the voice sound level of the communication in progress whether this communication is unintentional on the part of at least one of the users of the communication terminals T1 . . . Tn participating in the established communication. Thus, the communication closure triggering CCL verifies either the voice sound level of the communication in progress as a whole, that is to say over the whole set of audio streams originating from all the participating terminals: f1 . . . fn, or independently the voice sound level of each audio stream f1 . . . fn.

In particular, the communication closure triggering CCL determines that the communication is unintentional if the voice sound level svl is below a predetermined threshold for a predetermined duration. Thus, the communication closure triggering CCL searches for the communications in which a prolonged silence, or indeed an inaudible conversation or one which is audible with difficulty, is detected originating from at least one of the users of the terminals participating in the communication in progress.

In these cases, the communication closure triggering CCL commands, in particular, a closure stp of the communication in progress established by the establishment of communication CSTB, in particular by transmitting this command to the management of the exchanges COM. In particular, the closure command stp specifies a closure either of the communication in its entirety cstp, or of the participation of at least one of the terminals participating in the communication f1stp, f2stp ... $f_n$stp as a function of the sound level of each of the audio streams f1 ... fn.

In particular, the management method PG comprises a detection DTCT of the voice sound level of the communication in progress.

Thus, the detection of the voice sound level is an alternative to another type of detection of unintentional communication making it possible to verify the unintentional character of the communication based on the opportunity for this communication to allow the subject of a communication, namely a vocal exchange.

The detection DTCT performs either a global detection of the voice sound level nsv on the set f of audio streams exchanged f1, f2 ... fn during the communication in progress, or a detection of the voice sound level independently $\{nsv(fi)\}i=1 \ldots n$ on each of the audio streams exchanged f1, f2 ... fn during the communication in progress. In particular, the detection of the voice sound level is performed on the audio stream f1 originating from the requesting communication terminal. Thus, the automatic management of communication closes the communications that were requested unintentionally: silence or inaudible conversation on the part of the user of the requesting terminal T1 either because the terminal T1 is at the bottom of a bag, of a pocket or simply far from the user ... In particular, the detection of the voice sound level is performed on the audio stream f2 ... fn originating from at least one of the at least one recipient communication terminals T2 ... Tn. Thus, the automatic management of communication closes the communications that were accepted unintentionally.

In particular, when the communication is performed between a requesting communication terminal T1 and several recipient communication terminals, the communication closure CCL is triggered only for the recipient communication terminal from which an audio stream originates for which the detected voice sound level triggers a communication closure. Thus, during a telephone conference, if one of the recipient terminals has unintentionally accepted entry into the telephone conference, the communication with this recipient terminal will be closed but the communication between the other participating terminals will continue except of course if the recipient terminal is in mute mode.

In particular, the detection DTCT comprises an instantaneous detection iDTCT of the voice sound level providing the voice level at each instant and a timeout Δ allowing the detection DTCT to provide the sound voice level during a predetermined time. In this case, the detection DTCT provides the communication closure triggering CCL with a mean sound level over this predetermined time {Δ nsv (fi)}i=1 ... n.

Optionally, the detection DTCT comprises a verification (not illustrated) of the voice sound level with respect to a threshold voice sound level making it possible to verify whether the stream f, f1 ... fn carries a prolonged silence (threshold voice level=0) and/or a prolonged inaudible conversation (threshold voice sound level determined as a function of the mean hearing threshold), and to provide the communication closure triggering CCL with an item of information on the sound voice level insv.

In particular, the detection DTCT comprises at least two distinct timeouts (not illustrated) as a function of the voice sound level detected, that is to say that the prolonged silence will be detected over a predetermined duration, lower than an inaudible conversation. Thus, the communication closure triggering will end stp the communication more rapidly in the case of a prolonged silence than in the case of an inaudible conversation allowing the user who has either positioned the handset of their terminal poorly or who is momentarily distant from the latter (accidentally or in order to fetch an object) to be able to continue their conversation without the communication being cut off inadvertently by the method of automatic communication management PG of the invention.

In the case of an inadvertent communication request, the user of the requesting communication terminal T1 unaware that they have established a communication with at least one other communication terminal T2, if the user of the recipient terminal does not respond, the communication will automatically toggle over to the messaging of the recipient terminal.

By adjusting the predetermined duration so that, in particular, it is less than the duration of communication before toggling over to messaging, the toggling of the inadvertent communications over to messaging will be able to be avoided. Thus, the automatic management of communication avoids the overloading of the messaging connected with inadvertent communications.

In particular, the management method comprises a determination of maintaining CMT of the communication in progress as a function of at least one predetermined parameter pp of the communication in progress, the determination of maintaining controls the prevention of any automatic closure of communication of the communication in progress. This determination of maintaining CMT is performed either by deactivation, or by short-circuiting of the communication closure triggering as a function of at least one predetermined parameter of the communication in progress. The determination of maintaining CMT dispatches a maintaining command cnt either directly to the communication closure triggering CCL or to a short-circuiting CC placed on the output of the communication closure triggering CCL. Thus, when the determination of maintaining MNT determines that the communication ought not be closed automatically, it prevents the communication closure triggering CCL from performing its processing.

Thus, for pre-identified communications, the low voice sound level of the communication in progress will not trigger, exceptionally, the closure of the communication by the automatic management of communication PG.

In particular, the determination of maintaining CMT is triggered either with the management method PG as a whole, or by the establishment of communication CSTB, or by the communication closure triggering CCL during its triggering. Thus, as soon as a communication is established, the determination of maintaining CMT is implemented. The determination of maintaining MNT either captures one or more parameters pp of the communication in progress, or receives them from the management of the exchanges COM further to the direct or indirect triggering of the determination of maintaining MNT by the establishment of communication CSTB.

In particular, the at least one predetermined parameter comprises at least one of the following predetermined parameters:
   An identifier of a communication terminal which is a recipient of the communication in progress is a predetermined identifier;
   A parameter of mode of use of the communication terminal requesting the communication in progress is in mute mode.

Thus, the pre-identified communications for which the low voice sound level of the communication in progress will not trigger, exceptionally, the closure of the communication by the automatic management of communication, are in particular:
   communications with a pre-identified recipient such as an emergency center (fire brigade, paramedics, telemonitoring center, medical personnel, prerecorded emergency call number . . . ) thus allowing the caller in a distress situation to be able to remain in communication with a person accompanying them during this communication for as long as it takes for the emergency services to arrive in situ;
   telephone conferences which certain participants attend in mute mode.

In particular, the management method PG is triggered by an establishment of a communication CSTB between the at least two communication terminals.

Thus, either the management method monitors the establishment of the communications and is triggered during the establishment of a communication, or the method of communication establishment comprises a triggering of the management method after having received the recipient terminals' acceptance that the communication be enabled.

In particular, the management method PG is implemented by at least one of the following devices:
   the requesting communication terminal T1,
   at least one of the at least one recipient communication terminals T2 . . . Tn,
   a communication server through which the audio streams pass during the communication in progress.

Thus, the caller's terminal T1 will itself terminate the communications that it itself will have requested unintentionally and/or the called party's terminal T2 . . . Tn will itself terminate the inadvertent communications that it will receive or the users' terminals will be unburdened of the processing required for communication management by the communication server.

A particular embodiment of the invention is a program comprising program code instructions for the execution of the steps of the method of automatic communication management PG when said program is executed by a processor.

FIG. 3a illustrates a simplified diagram of a communication architecture implementing the invention.

The communication architecture comprises at least two communication terminals 1 and $2_1$, in particular a requesting terminal 1 and at least one recipient terminal $2_1 \ldots 2_{n-1}$. Each of the communication terminals 1, $2_1 \ldots 2_{n-1}$ comprises a communication module respectively 10, $20_1 \ldots 20_{n-1}$. The communication module 10, $20_1 \ldots 20_{n-1}$ comprises at least one transmitter making it possible to send at least one audio stream to another communication terminal and a receiver making it possible to receive at least one audio stream from another communication terminal.

In particular, the communication architecture comprises a communication device 3 making it possible in particular to establish a communication between at least two of the communication terminals 1, $2_1 \ldots 2_{n-1}$.

At least one of the devices of the communication architecture comprises a device for automatic management of communication according to the invention 11, $21_1 \ldots 21_{n-1}$, 31. This management device is illustrated in greater detail in FIG. 3b.

In particular, at least one communication terminal 1, $2_1 \ldots 2_{n-1}$ comprises:
   a module 10, $20_1 \ldots 20_{n-1}$ for communication with at least one communication terminal 1, $2_1 \ldots 2_{n-1}$,
   a device 11, $21_1 \ldots 21_{n-1}$ for automatic management of communication in progress between the communication terminal and at least one other communication terminal: a communication terminal requesting the establishment of a communication and at least one communication terminal which is a recipient of the requested communication, the management device comprising a closure trigger for closing the communication in progress as a function of a voice sound level detected for a predetermined duration during the communication in progress.

FIG. 3b illustrates a simplified diagram of a device for automatic management of communication according to the invention, used by the communication architecture of FIG. 3a.

The management device x1 is implemented in a single or several of the devices of the communication architecture of FIG. 3a, in particular in the form of the management device 11 of the communication terminal 1, of the management device $21_1 \ldots 21_{n-1}$ of the respective communication terminal $2_1 \ldots 2_{n-1}$, or indeed of the management device 31 of the communication device 3.

The management device x1 allows automatic management of communication in progress between at least two communication terminals: a communication terminal 1 requesting the establishment of a communication and at least one recipient communication terminal $2_1 \ldots 2_{n-1}$ receiving the requested communication.

The management device x1 comprises a communication closure trigger x10. The trigger x10 is able to trigger a closure of the communication in progress as a function of a voice sound level detected for a predetermined duration during the communication in progress.

This trigger x10 controls stp the closure of the communication in progress between at least two communication terminals 1, $2_1 \ldots 2_{n-1}$. The management device x1 controlling the closure of communication in progress is implemented in at least one of the communication terminals 1, $2_1 \ldots 2_{n-1}$ involved in the communication in progress and/or the communication device 3 that established the communication in progress.

In particular, the management device x1 comprises a voice sound level detector x11 receiving either the complete stream f of the exchanges of the communication in progress, that is to say without distinction of origin, or at least one of the streams f1, f2, . . . fn sent by at least one of the communication terminals, respectively 1, $2_1 \ldots 2_{n-1}$, participating in the communication in progress.

In particular, the management device x1, respectively 11, $21_1 \ldots 21_{n-1}$, 31, comprises a monitoring module X12 monitoring at least the communication module, respectively $2_1 \ldots 2_{n-1}$, 3. Thus, the monitoring module x12 triggers the management device, in particular, the communication closure trigger x10 when it detects or is informed cok of an establishment of a communication.

In particular, the management device x1 comprises a communication maintaining module x13 preventing any automatic closure of the communication in progress as a function of parameter pp of the communication in progress. In particular, the management device x1 comprises a short-circuit x14 placed on the closure control output of the communication closure trigger x10. The short-circuit x14 is controlled by the maintaining module x13.

As illustrated by FIG. 3a, to establish a communication, a first communication terminal, the requesting communication terminal 1, in particular its communication module 10, dispatches to at least one recipient communication terminal $2_1 \ldots 2_{n-1}$ a request 1.c_req(T1→T2 . . . Tn) for establishment of communication with this at least one second communication terminal $2_1 \ldots 2_{n-1}$. This request 1.c_req (T1→T2 . . . Tn) for establishment of communication is in particular relayed by a communication device 3 of a communication network, in particular its communication module 30 able to establish a communication session: 1a.c_req (T1→T2) . . . 1n.c_req(T1→Tn).

Each of the recipient communication terminal or terminals $2_1 \ldots 2_{n-1}$ respond to this request, respectively 1a.c_req (T1→T2) . . . 1n.c_req(T1→Tn), either by accepting: 2a. ok . . . 2n. ok, or by refusing the communication triggering in the case of an acceptance the opening of a communication session between the requesting terminal 1 and the recipient terminals $2_1 \ldots 2_{n-1}$ that have accepted the communication: 3.css.

In the case where the establishment request has been relayed by a communication device 3, the communication device 3 triggers the opening of the communication session 3.css and, optionally, relays the responses toward the requesting terminal.

The communication having been established, streams 4.f are exchanged between the communication terminals participating in the communication, namely the requesting terminal 1, and the recipient terminals that have accepted the communication $2_1 \ldots 2_{n-1}$.

In parallel with the establishment of the communication 3.css, the management device or devices 11, $21_1 \ldots 21_{n-1}$, 31 are triggered 5.trg, 5a.trg . . . 5n.trg, $5_3$.trg, As illustrated by FIG. 3b, the triggering command trg is received, in particular, by the communication closure trigger x10.

In particular, the monitoring module x12 triggers trg the automatic management of the communications, for example either by triggering, or by starting the communication closure trigger x10. The monitoring module x12 captures, detects or receives either a communication session opening command 3.css or an acceptance of a communication cok. A communication module 10, $20_1 \ldots 20_{n-1}$, 30 of the device implementing the management device 11, $21_1 \ldots 21_{n-1}$, 31 implemented dispatches, in particular, this item of information: opening of session or acceptance of communication to the management device x10 (respectively 11, $21_1 \ldots 21_{n-1}$, 31) and, in particular, to its monitoring module x12.

The communication closure trigger x10 determines as a function of the voice sound level nsv of the communication in progress whether the communication is inadvertent either because the requesting terminal has unintentionally requested initiation of communication, or because the recipient terminal has unintentionally accepted the request for initiation of communication. Accordingly, either the trigger receives either the overall voice sound level nsv of communication in progress, or the voice sound level of at least one stream $nsv(f_i)$ sent by one of the terminals participating in the communication in progress (these sound levels optionally being provided for, or indeed averaged over, a predetermined duration $\Delta:\Delta$ $nsv(f_i)$) or directly the overall stream f or at least one of the streams $f_i$ sent by one of the terminals participating in the communication in progress (in particular, the stream sent by the communication terminal on which the management device x1 is implemented).

Optionally these items of information (voice sound levels and/or streams) are transmitted to the trigger x10 on request nsvrq either to a sound level detector, for example a detector x11 implemented in the management device x1, or to the communication module of the device implementing the management device x1 . . . .

When the trigger x10 determines that the communication in progress is inadvertent, it dispatches a communication closure command stp to the communication module 10, $20_1 \ldots 20_{n-1}$, 30 of the device 1, $2_1 \ldots 2_{n-1}$, 3 implementing the management device, x1, i.e. respectively 11, $21_1 \ldots$ $21_{n-1}$, 31. This command can be either a global command cstp closing the communication between all the participating terminals (in particular in the case of a communication between two terminals and/or in the case of a communication requested inadvertently), or a targeted command $f_1$stp . . . $f_n$stp for closure of the participation of a terminal in the communication in progress (in particular in the case of inadvertent acceptance of a communication between at least 3 communication terminals).

In particular, the management device x1 comprises a voice sound level detector x11, optionally implemented in the trigger x10 (not illustrated). The detector x11 receives either the overall stream f or at least one of the streams $f_i$ sent by one of the terminals participating in the communication in progress (in particular, the stream sent by the communication terminal on which the management device x1 is implemented). The detector x11 determines for each stream received a voice sound level: respectively an overall voice sound level nsv of communication in progress, a voice sound level of at least one stream $nsv(f_i)$ sent by one of the terminals participating in the communication in progress. The detector x11 provides, or indeed averages, these sound levels over a predetermined duration $\Delta:\Delta$ $nsv(f_i)$.

Optionally, the detector x11 verifies the voice sound level with respect to at least one predetermined threshold (for example a threshold corresponding to silence and/or a threshold corresponding to an inaudible conversation for a predefined user group . . . ), and provides the trigger x10 with an item of information relating to the voice sound level resulting from this verification.

The sound level detector x11 provides the trigger x10 with at least one sound level or an item of information relating to the voice sound level as soon as the management device x1 or the trigger x10 is triggered by the establishment of a communication or on request nsvrq, for example of the trigger x10, or as soon as the information on the voice sound level indicates an inadvertent communication (for example when the detector has verified that the voice sound level of the stream was below a predetermined threshold for a predetermined duration associated with the threshold in question).

In particular, the management device x1 comprises a communication maintaining module x13 receiving data pp relating to the communication in progress, particularly parameters of the communication in progress such as identifiers, parameters of use of at least one of the communication terminals participating in the communication in progress.

The maintaining module x13 determines whether the communication in progress must be processed in an exceptional manner by the management device x1 as a function of the data received pp. For example, in the case where the communication is intended for an emergency center: fire brigade, paramedics, police, medical aid service . . . the maintaining module x13 will determine on the basis of the identifier of the recipient terminal that the communication must be maintained even in case of prolonged silence and of inaudible conversation. Another example, in the case where one of the terminals participating in the communication in progress is in mute mode, in dual-call-in-progress mode, in loudspeaker mode . . . , the maintaining module x13 will determine on the basis of its parameters of use of the communication terminal participating in the communication that the communication must be maintained even in case respectively of prolonged silence, of inaudible conversation originating from the communication terminal thus parametrized.

The maintaining module x13 will then dispatch a maintaining command cnt either to the trigger x10, or a short-circuit x14. In particular, the maintaining command cnt will prevent either any closure of communication in progress, or only the closure of the participation of a terminal in the communication in progress (in the case in particular of a decision to maintain parameter of use of terminals).

FIG. 4a illustrates a simplified chart of exchanges illustrating the implementation of a management method according to the invention in the case of a communication between two communication terminals.

A requesting terminal T1 requests c_req(T1→T2) an establishment of a communication with a recipient terminal T2 of a communication network to a communication device DC. Further to this request, the communication device DC placed in the communication network establishes the communication css between the two communication terminals T1 and T2.

In particular, the communication device DC relays the request c_req(T1→T2) to the recipient terminal T2. Optionally, the communication is established by the communication device DC only if the recipient terminal T2 responds to the request by accepting ok the establishment of communication. In this case, the communication device DC relays, in particular also the response to the request, such as the acceptance ok, to the requesting terminal T1.

In particular, the establishment of the communication css triggers at least one management method PG. One or more of the devices participating in the communication in progress, in particular the requesting terminal T1 and/or the recipient terminal T2 and/or the communication device DC, implements the management method PG according to the invention.

During the communication, the requesting terminal T1 sends streams f1 destined for the recipient terminal T2 which are optionally relayed by the communication device DC, and the recipient terminal T2 sends streams f2 destined for the requesting terminal T1, if appropriate also relayed by the communication device DC.

One or more of these streams f1, f2 are optionally also received by the management method PG or analyzed by the management method to determine their respective voice sound levels and decide to trigger a closure of the communication in progress as a function of the sound levels determined. Alternatively the overall voice sound level of these streams f1, f2 and/or the voice sound level of one or more of these streams f1, f2 are optionally received by the management method PG or analyzed by the management method to decide to trigger a closure of the communication in progress as a function of the sound levels received and/or analyzed.

When at least one management method PG of at least one of the devices: requesting terminal T1, recipient terminal T2, communication device 3, decides to trigger the closure of the communication in progress, it dispatches a command stp to the communication method PC of the device in question, respectively requesting terminal T1, recipient terminal T2, communication device 3, which transmits a communication closure request ccl_req to the other devices involved in the communication in progress, respectively the recipient terminal T2 and the communication device 3, the requesting terminal T1 and the communication device 3, the requesting terminal T1 and the recipient terminal T2. The communication is then closed.

Thus, upon an inadvertent request for communication on the part of the terminal T1:
if the terminal T1 implements a management method that processes only the outgoing streams f1, the management method implemented by the terminal T1 can trigger the closure of the communication that it requested inadvertently;
if the terminal T1 does not implement a management method PG, but such a management method PG is implemented by the communication device DC or the second terminal T2, it will be possible for communication closure to be requested ccl_req by these devices only if the management method analyses the incoming streams f1.

Likewise, upon an inadvertent acceptance of communication on the part of the terminal T2:
if the terminal T2 implements a management method that processes only the outgoing streams f2, the management method implemented by the terminal T2 can trigger the closure of the communication that it accepted inadvertently;
if the terminal T2 does not implement a management method PG, but such a management method PG is implemented by the communication device DC or the first terminal T1, it will be possible for communication closure to be requested ccl_req by these devices only if the management method analyses the incoming streams f2.

FIG. 4b illustrates a simplified chart of exchanges illustrating the implementation of a method according to the invention in the case of a conference between three communication terminals.

A requesting terminal T1 requests c_req(T1→T2,T3) an establishment of a communication with two recipient terminals T2 and T3 of a communication network. Further to this request, the communication css is established between the three communication terminals T1, T2 and T3. Optionally, the communication is established only with the recipient terminals T2, T3 that have responded to the request by accepting ok the establishment of communication destined for the requesting terminal T1.

In particular, the establishment of the communication css triggers at least one management method PG. One or more of the communication terminals T1, T2, T3 participating in the communication in progress implements the management method PG according to the invention.

During the communication, the requesting terminal T1 sends streams f1 destined for the recipient terminals T2 and T3, the recipient terminal T2 sends streams f2 destined for the requesting terminal T1 and for the other recipient terminal T3, and the recipient terminal T3 sends streams f3 destined for the requesting terminal T1 and for the other recipient terminal T2.

One or more of these streams f1, f2, f3 are optionally also received by the management method PG or analyzed by the management method to determine their respective voice sound levels and decide to trigger a closure of the communication in progress as a function of the sound levels determined. Alternatively the overall voice sound level of these streams f1, f2, f3 and/or the voice sound level of one or more of these streams f1, f2, f3 are optionally received by the management method PG or analyzed by the management method to decide to trigger a closure of the communication in progress as a function of the sound levels received and/or analyzed.

When at least one management method PG of at least one of the terminals T1, T2, T3, decides to trigger the closure of the communication in progress, it dispatches a command stp to the communication method PC of the terminal in question, respectively requesting terminal T1, recipient terminal T2, recipient terminal T3, which transmits a communication closure request ccl_req to the other devices involved in the communication in progress, respectively the recipient terminal T2 and the communication device 3, the requesting terminal T1 and the communication device 3, the requesting terminal T1 and the recipient terminal T2. The communication is then closed.

Thus, upon an inadvertent request for communication on the part of the terminal T1:
- if the terminal T1 implements a management method that processes only the outgoing streams f1, the management method implemented by the terminal T1 can trigger the closure of the communication that it requested inadvertently;
- if the terminal T1 does not implement a management method PG, but such a management method PG is implemented by at least one of the recipient terminals T2, T3, it will be possible for communication closure to be requested ccl_req by these recipient terminals only if the management method analyses the incoming streams f1.

Likewise, upon an inadvertent acceptance of communication on the part of a recipient terminal T2 or T3:
- if the recipient terminal T2 or T3 implements a management method that processes only the outgoing streams f2 or f3, the management method implemented by the terminal T2 or T3 can trigger the closure of the communication that it accepted inadvertently;
- if the terminal T2 or T3 does not implement a management method PG, but such a management method PG is implemented by the other recipient terminal T3 or T2 or the requesting terminal T1, it will be possible for communication closure to be requested ccl_req by these devices only if the management method analyses the incoming streams f2 or f3.

Furthermore, in the case of an inadvertent acceptance of communication on the part of a recipient terminal (T3 in our example), the determination by the method of management of the inadvertent acceptance by a single of the recipient terminals may, in an alternative manner, bring about the command, by the management method PG, for triggering a closure of participation ccl3_req of this recipient terminal T3 in the communication in progress. Thus, the communication between the terminals T1 and T2 will be able to continue without being interrupted by an inaudible conversation originating from T3 that unintentionally accepted the communication. The closure of participation of a terminal will thus make it possible to reduce the noise audible during a communication.

Optionally, instead of a command for closure of participation in a communication, the management method, in particular when it is implemented by the terminal in question T3, will control the modification of parameter of the communication terminal, in particular switching to mute mode. This switching to mute mode will make it possible to limit the noise in a communication involving at least three communication terminals while avoiding inadvertent automatic culture cutoffs for the users of communication terminals who are viewers of the communication, for example during a telephone conference.

The invention also envisages a medium. The information medium may be any entity or device capable of storing the program. For example, the medium can comprise a storage means, such as a ROM, for example a CD ROM or a microelectronic circuit ROM or else a magnetic recording means, for example a diskette or a hard disk. Moreover, the information medium may be a transmissible medium such as an electrical or optical signal which can be conveyed via an electrical or optical cable, by radio or by other means. The program according to the invention can be in particular downloaded from a network in particular of Internet type. Alternatively, the information medium may be an integrated circuit into which the program is incorporated, the circuit being adapted to execute or to be used in the execution of the method in question.

In another implementation, the invention is implemented by means of software components and/or hardware components. In this regard the term module may correspond equally well to a software component or to a hardware component. A software component corresponds to one or more computer programs, one or more subprograms of a program, or more generally to any element of a program or of a piece of software able to implement a function or a function set according to the description hereinbelow. A hardware component corresponds to any element of a hardware assembly able to implement a function or a set of functions.

The invention claimed is:

1. A method of management of a voice communication in progress between at least a programmable mobile communication terminal requesting the establishment of a voice communication and at least one mobile communication terminal which is a recipient of the requested voice communication, the voice communication in progress including a plurality of audio streams sent by mobile communication terminals, the management method performed by one of the mobile communication terminals and comprising:
   a triggering, by a programmable processor, of a closure of the voice communication in progress upon a determination that a volume detected on one of the plurality of audio streams sent by mobile communication terminals of the established voice communication in progress has remained below a predetermined threshold for a predetermined duration during the voice communication in progress; and
   an automatic determining, by a programmable processor, of the maintaining of the voice communication in progress as a function of at least one predetermined parameter of at least one of the mobile communication terminals of the voice communication in progress, the at least one predetermined parameter including a mode of use parameter of a mobile communication terminal, the determination of maintaining controlling the prevention of any automatic closure of communication of the voice communication in progress.

2. The method of claim 1, wherein the management method additionally comprises a detection of the voice volume of the voice communication in progress.

3. The method of claim 1, wherein the at least one predetermined parameter comprises at least one of the following predetermined parameters:
an identifier of a mobile communication terminal which is a recipient of the communication in progress is a predetermined identifier;
a parameter of mode of use of the programmable mobile communication terminal requesting the voice communication in progress is in mute mode.

4. The method of claim 1, wherein the management method is triggered by an establishment of a voice communication between the at least two communication terminals.

5. The method of claim 1, wherein the management method is implemented by at least one of the following devices:
the requesting programmable mobile communication terminal, and
at least one of the at least one recipient mobile communication terminals.

6. The method of claim 1, wherein the voice communication comprises a first audio stream originating from the requesting mobile communication terminal and a second audio stream originating from at least one of the at least one recipient mobile communication terminals, and wherein detection of the volume is performed on the first audio stream originating from the requesting programmable mobile communication terminal.

7. The method of claim 1, wherein the voice communication comprises a first audio stream originating from the requesting mobile communication terminal and a second audio stream originating from at least one of the at least one recipient mobile communication terminals, and wherein detection of the volume is performed on the second audio stream originating from at least one of the at least one recipient mobile communication terminals.

8. The method of claim 7, wherein the predetermined duration is less than a duration of a voice communication before toggling over to messaging.

9. The method of claim 7, wherein, when the voice communication is performed between a requesting programmable mobile communication terminal and several recipient mobile communication terminals, communication closure is triggered only for the recipient mobile communication terminal from which an audio stream originates for which the detected voice volume triggers a communication closure.

10. A non-transitory computer readable medium having stored thereon executable instructions, which when run by a programmable processor, causes the processor to perform the method of claim 1.

11. A programmable device for managing a voice communication in progress between at least a programmable mobile communication terminal requesting the establishment of a voice communication and at least one mobile communication terminal which is a recipient of the requested communication, the voice communication in progress including a plurality of audio streams sent by mobile communication terminals, the programmable device comprising a programmable processor of one of the mobile communication terminals, the processor configured to:
trigger a closure of the voice communication in progress, upon a detection of silence indicative of an unintentional communication on one of the plurality of audio streams sent by mobile communication terminals of the established voice communication in progress for a predetermined duration during the voice communication in progress; and
determine whether to maintain the voice communication in process as a function of at least one predetermined parameter of at least one of the mobile communication terminals of the voice communication in progress, the at least one predetermined parameter including a mode of use parameter of a mobile communication terminal, a determination to maintain the voice communication in progress preventing the triggered closure of the voice communication in process.

12. A programmable communication terminal comprising:
a transmitter for voice communication with at least one other mobile communication terminal, and
a programmable device for managing a voice communication in progress between the programmable communication terminal and at least one other mobile communication terminal, the voice communication in progress including a plurality of audio streams sent by mobile communication terminals, one of the mobile communication terminal and the at least one other programmable communication terminal requesting the establishment of the voice communication and the other of the communication terminal and the at least one other voice communication terminal being a recipient of the requested communication, the programmable device comprising:
a closure trigger configured to close the voice communication in progress upon a determination that a volume detected on one of the plurality of audio streams sent by mobile communication terminals of the established voice communication in progress has remained below a predetermined threshold for a predetermined duration during the voice communication in progress;
the programmable device configured to:
determine whether to maintain the voice communication in progress, the determination of whether to maintain the voice communication in progress being made as a function of at least one predetermined parameter of at least one of the mobile communication terminals of the voice communication in progress, the at least one predetermined parameter including a mode of use parameter of a mobile communication terminal, the determination of maintaining controlling the prevention of any automatic closure of communication of the voice communication in progress.

13. The method of claim 1, wherein the automatic determining of the maintaining of the voice communication in progress as a function of at least one predetermined parameter of at least one of the mobile communication terminals of the voice communication in progress is performed without requesting action on the part of a user.

14. The method of claim 1, wherein the triggering of the closure of the voice communication in progress is triggered as a function of a voice volume detected on a first audio stream sent by a first mobile communication terminal, and wherein the closure of the voice communication in progress is triggered by a device other than the first mobile communication terminal which sent the first audio stream.

15. The method of claim 1, additionally comprising monitoring each of the plurality of audio streams sent by mobile communication terminals of the established voice communication in progress.

\* \* \* \* \*